(12) United States Patent
Castillo (10) Patent No.: US 9,387,551 B2
(45) Date of Patent: Jul. 12, 2016

(54) METHOD, SYSTEM, AND COMPUTER PROGRAM PRODUCT FOR SIMULATING FRICTION STIR WELDING

(75) Inventor: Alfredo Castillo, San Jose, CA (US)

(73) Assignee: Apple Inc., Cupertino, CA (US)

( * ) Notice: Subject to any disclaimer, the term of this patent is extended or adjusted under 35 U.S.C. 154(b) by 882 days.

(21) Appl. No.: 13/605,969

(22) Filed: Sep. 6, 2012

(65) Prior Publication Data

US 2014/0067286 A1 Mar. 6, 2014

(51) Int. Cl.
| | | |
|---|---|---|
| *G01L 1/00* | (2006.01) | |
| *B23K 20/12* | (2006.01) | |
| *B23K 31/00* | (2006.01) | |
| *B23K 31/12* | (2006.01) | |

(52) U.S. Cl.
CPC ............. *B23K 20/122* (2013.01); *B23K 20/123* (2013.01); *B23K 31/00* (2013.01); *B23K 31/12* (2013.01)

(58) Field of Classification Search
CPC ...... B23K 31/00; B23K 31/12; B23K 20/122; B23K 20/123
USPC ....................... 702/41; 73/118.01; 228/112.1, 228/102–104, 8–10
See application file for complete search history.

(56) References Cited

U.S. PATENT DOCUMENTS

| | | | |
|---|---|---|---|
| 6,742,696 B2 | 6/2004 | Thompson | |
| 6,811,632 B2 | 11/2004 | Nelson et al. | |
| 6,857,553 B1 * | 2/2005 | Hartman | B23K 20/121 228/103 |
| 7,537,150 B2 | 5/2009 | Burton et al. | |
| 7,703,654 B2 | 4/2010 | Burton et al. | |
| 8,544,714 B1 * | 10/2013 | Obaditch et al. | 228/102 |
| 2003/0071615 A1 * | 4/2003 | Schlicker et al. | 324/242 |
| 2005/0017713 A1 * | 1/2005 | Goldfine et al. | 324/240 |
| 2008/0073409 A1 * | 3/2008 | Ostersehlte | 228/102 |
| 2009/0294511 A1 * | 12/2009 | Fleming et al. | 228/103 |
| 2010/0072261 A1 * | 3/2010 | Cruz et al. | 228/102 |
| 2011/0068150 A1 * | 3/2011 | Baumann et al. | 228/114 |
| 2011/0309131 A1 | 12/2011 | Hovanski et al. | |

OTHER PUBLICATIONS

M. Yadava, "Material Flow and Microstructure Evolution in Friction Stir Welding of AA6111 Alloy Sheets", Missouri University of Science and Technology, 2009.*
Norton, "Ferrous Friction Stir Weld Physical Simulation", Ohio State University, 2006.*

* cited by examiner

*Primary Examiner* — Mischita Henson
*Assistant Examiner* — Stephanie Bloss
(74) *Attorney, Agent, or Firm* — Downey Brand LLP (57) ABSTRACT

A method for simulating friction stir welding is provided. The method may include restraining first and second parts in a fixture. The method may also include axially forcing a non-rotating friction stir welding tool against a joint between the parts. Thereafter one or more resultant parameters may be measured, such as displacement of the first part, the second parts, and/or the fixture. The resultant parameters may also include the force applied to the first part, the second parts, and/or the fixture. Thereby, movement of the parts and fixture that may occur during friction stir welding may be simulated without actually completing a welding operation. A related system and computer program product are also provided.

20 Claims, 11 Drawing Sheets

METHOD, SYSTEM, AND COMPUTER PROGRAM PRODUCT FOR SIMULATING FRICTION STIR WELDING

TECHNICAL FIELD

The present disclosure relates generally to friction stir welding, and more particularly to methods, systems, and computer program products for simulating friction stir welding.

BACKGROUND

Various types of methods and apparatuses have been developed for joining two parts. Example embodiments of methods for joining two parts include adhesive bonding, welding, use of fasteners, etc. In the context of joining certain materials, such as metals, welding has been identified as a suitable method presently in use today.

Various forms of welding methods exist. Example embodiments of welding methods include laser welding, arc welding, gas welding, and friction stir welding. Friction stir welding may present certain advantages over other forms of welding. For example, friction stir welding may not involve heating the parts being welded to as great of an extent as other forms of welding. Further, friction stir welding may not require use of flux or gases which could introduce contaminants into the weld. However, the formation of suitably strong and aesthetically appealing welds using friction stir welding may present certain challenges.

Accordingly, systems, methods, and a computer program product for simulating friction stir welding are provided.

SUMMARY

A method for simulating friction stir welding is provided. The method may include restraining first and second parts in a fixture. A non-rotating friction stir welding test tool may be axially forced against the parts along a joint therebetween. The test tool may apply force at a static location or transversely move along a path that simulates a friction stir welding path. Thereby, the force transferred to the parts and the fixture and the displacement of the parts and the fixture may be measured. In this regard, the axially applied force may simulate the force applied during an actual friction stir welding operation. Thereby, for example, the sufficiency of the strength of the fixture and the parts may be determined. However, due to the test tool being pressed against the parts without actually rotating and welding, the simulation procedure may be relatively safe and not expend materials.

By simulating friction stir welding in this manner, a maximum axial force that may be applied without exceeding a predetermined displacement limit of one of the first part, the second part, and/or the fixture may be determined. Alternatively, a desired force may be applied to the parts, and the displacement and forces applied to the parts and the fixture may be measured. The resultant parameters may also be employed for a variety of other purposes.

A related system for simulating friction stir welding and computer code for controlling a system for simulating friction stir welding system are also provided.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed assemblies, methods, and systems. These drawings in no way limit any changes in form and detail that may be made to the disclosure by one skilled in the art without departing from the spirit and scope of the disclosure.

DETAILED DESCRIPTION

Exemplary applications of apparatuses, systems, methods, and computer program products according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

Friction stir welding is a method for joining two parts which may present certain advantages over other forms of welding. For example, friction stir welding may not heat the parts being welded to as great of an extent as other forms of welding. In this regard, certain materials may not be able to withstand temperatures associated with other forms of welding. Further, subjecting the parts to high heat may cause the parts to warp. Stresses may also build at the joint between the parts as a result of the heat that may eventually lead to failure of the weld.

Additionally, friction stir welding may be advantageous in that it may not require use of flux or gases which could introduce contaminants into the weld. Introduction of contaminants into the weld may affect other operations later performed on the parts that are welded together. For example, it may be more difficult to anodize the parts when contaminants have been introduced into the weld.

Friction-stir welding is a solid-state joining process (meaning the metal is not melted) and may be used in applications where the original metal characteristics must remain unchanged as far as possible. Friction stir welding functions by mechanically intermixing the two pieces of metal at the place of the joint, transforming them into a softened state that allows the metal to be fused using mechanical pressure. This process is primarily used on aluminum, although other materials may be welded, and is most often used on large pieces which cannot be easily heat treated post weld to recover temper characteristics.

Figure 1:
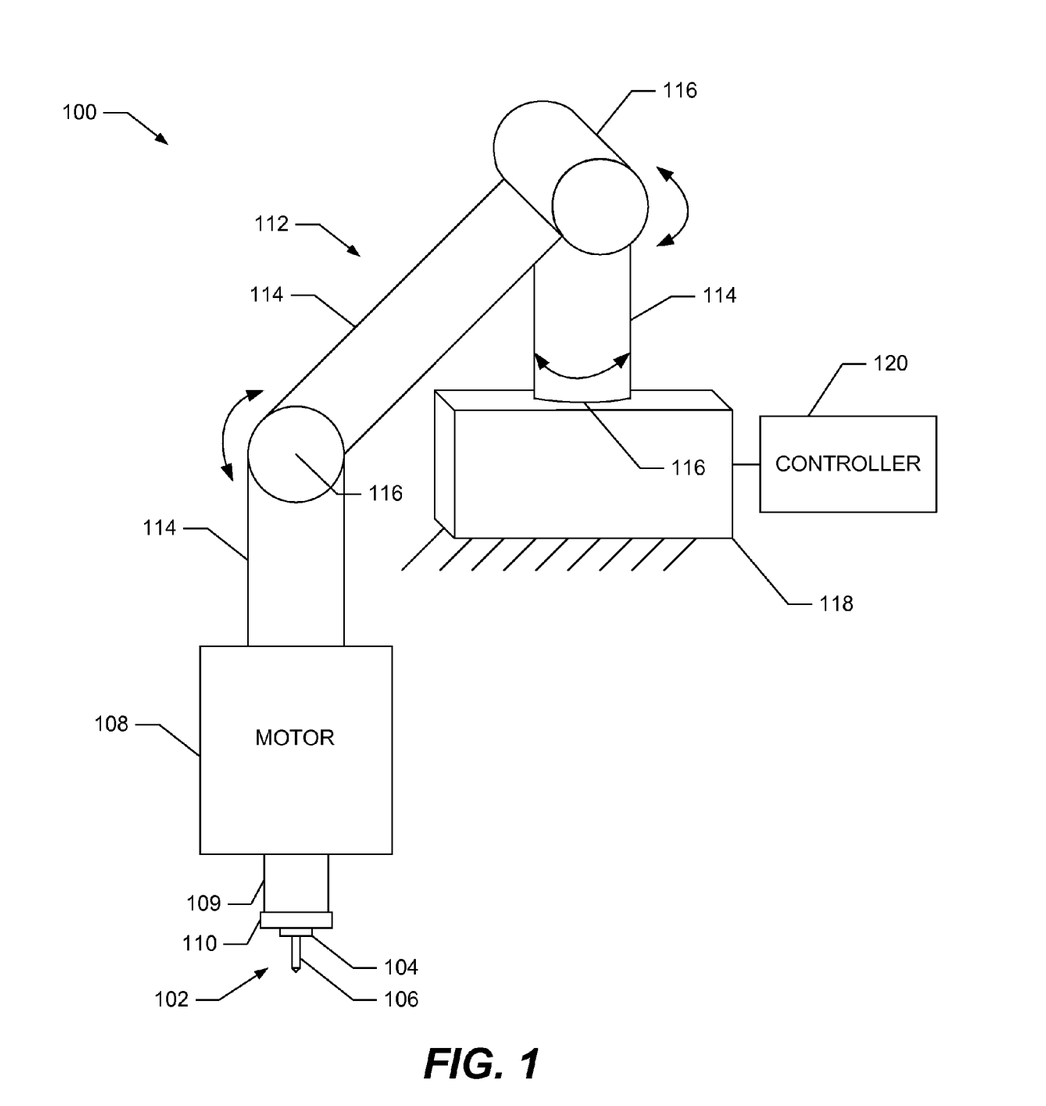
FIG. 1 schematically illustrates a system for friction stir welding.

FIG. 1 illustrates a friction stir welding system 100 according to an embodiment of the present disclosure. The friction stir welding system 100 may include a friction stir welding tool 102 configured to friction stir weld a first part to a second part along a joint therebetween. The friction stir welding tool 102 may include shoe 104 and a pin 106.

A motor 108 may be configured to rotate the friction stir welding tool 102 by rotating a spindle 109 and a tool holder 110 coupled therebetween. Further, an actuator 112 may be configured to apply an axial force along the friction stir welding tool 102 against the parts being welded. The actuator 112 may also displace the friction stir welding tool 102 relative to the parts being welded along the joint therebetween.

In the illustrated embodiment, the actuator 112 comprises a robotic assembly. As illustrated, the robotic assembly may include one or more arms 114, one or more joints 116, and a base 118. Thus, the arms 114 may be rotated about the joints 116 to position the friction stir welding tool 102 at an appropriate position to friction stir weld the joint between the parts. However, various other embodiments of actuators (e.g., gantry systems) may be employed to control the position of the friction stir welding tool 102 relative to the parts being welded.

Regardless of the particular embodiment of actuator employed, the friction stir welding system 100 may further comprise a controller 120. The controller 120 may be configured to control the actuator 112, the motor 108, and/or or other portions of the friction stir welding system 100. Thus, the friction stir welding system 100 may be employed to weld together parts along a joint therebetween.

Figure 2:
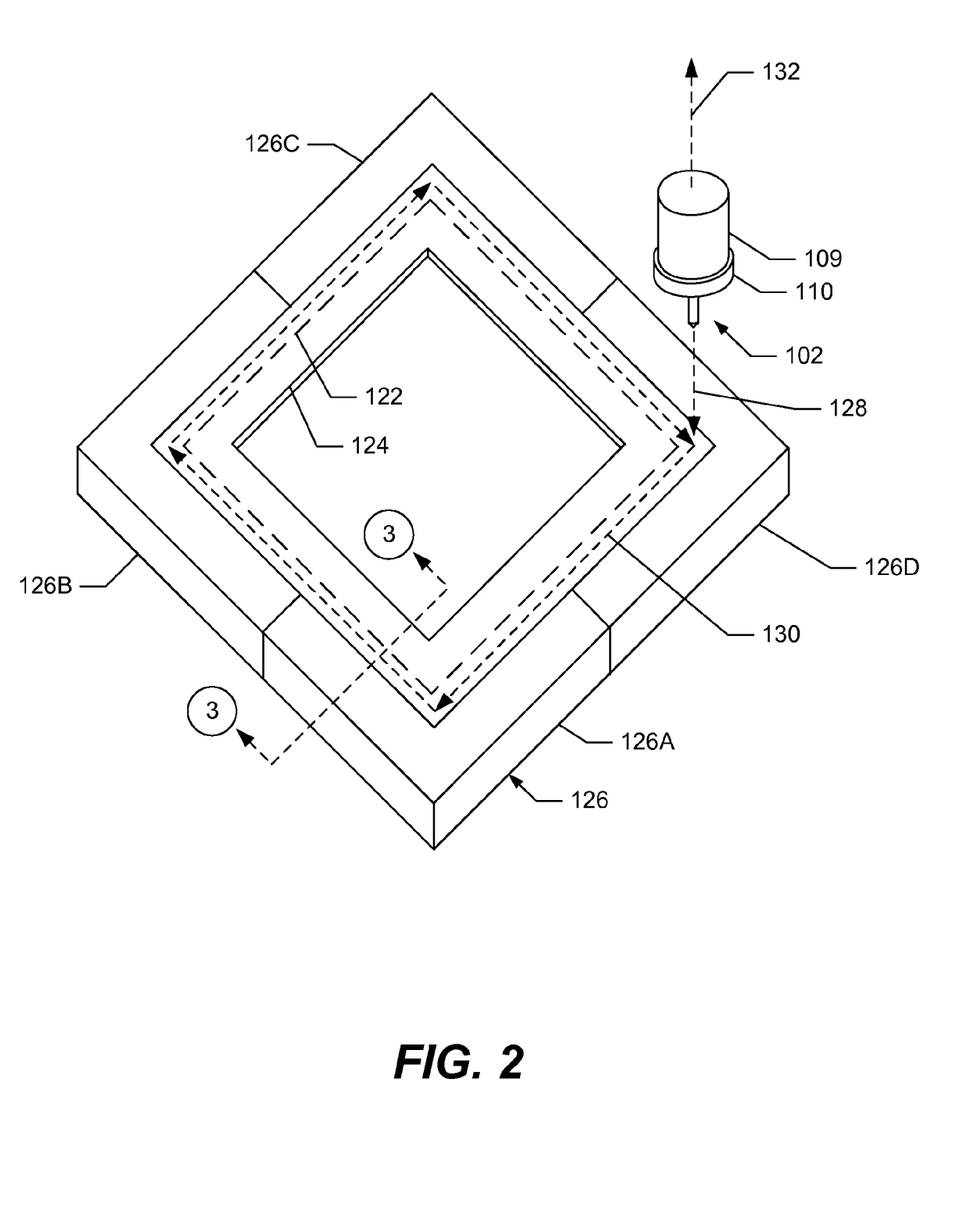
FIG. 2 illustrates a perspective view of the operations performed during friction stir welding a first part to a second part in a fixture.

FIG. 2 schematically illustrates an example embodiment of the friction stir welding process. The spindle 109 and tool holder 110 are shown, but the remainder of the friction stir welding system 100 is not shown for clarity purposes. Additionally, as may be understood, various other embodiments of friction stir welding systems may be employed to conduct the friction stir welding process.

Figure 3:
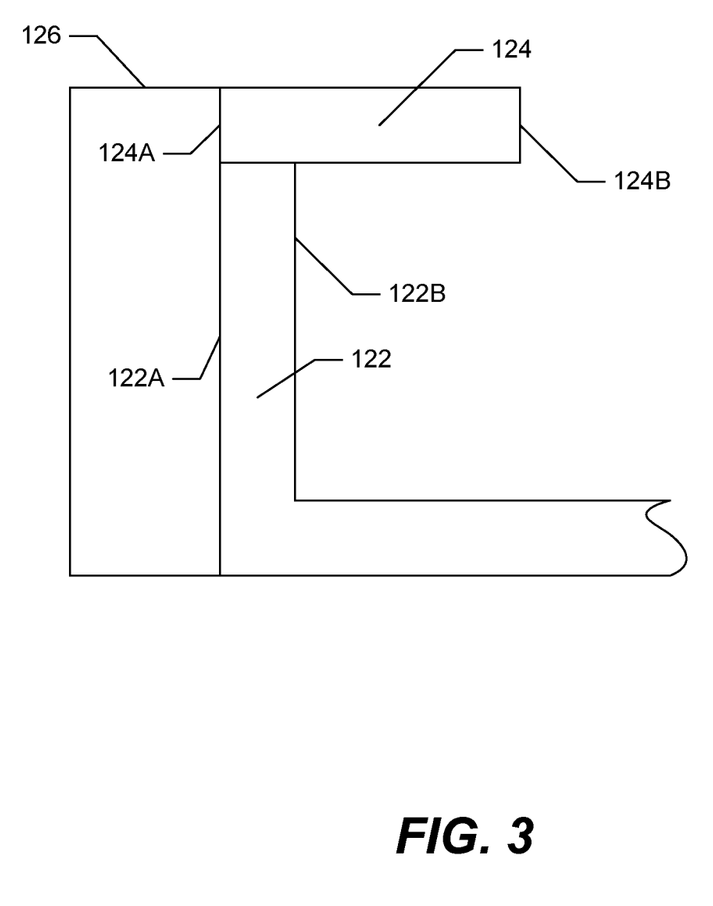
FIG. 3 illustrates a cross-sectional view through the fixture of FIG. 2 along line 3-3 prior to friction stir welding.

As illustrated in FIG. 2, a first part 122 can be joined to a second part 124 via friction stir welding using the constantly rotated friction stir welding tool 102. A fixture 126 may be employed to retain the first part 122 and the second part 124 in the desired configuration. In some embodiments the fixture 126 may comprise multiple parts 126A-D, which may be clamped together to retain the parts 122, 124 in place. As illustrated in FIG. 3, which is a cross-sectional view along line 3-3, the first part 122 and the second part 124 may be configured perpendicularly to one another to form a joint therebetween in some embodiments.

As further illustrated in FIG. 2, in order to weld the first part 122 and the second part 124 together, the friction stir welding tool 102 may initially be inserted into the joint, for example, by directing the tool downwardly along a path 128. The friction stir welding tool 102 may then be transversely fed along a path 130 following the desired position of the weld between the first part 122 and the second part 124. The pin 106 may be slightly shorter than the weld depth required, with the shoe 104 riding atop the work surface.

Frictional heat is generated between the wear-resistant welding components defining the friction stir welding tool 102 and the parts 122, 124 being welded. This heat, along with that generated by the mechanical mixing process and the adiabatic heat within the material, cause the stirred materials to soften without melting. As the pin 106 is moved forward along the path 130 the plasticized material moves to the rear where clamping force may assist in a forged consolidation the weld. This process of the friction stir welding tool 102 traversing along the weld line in a plasticized tubular shaft of material may result in severe solid state deformation involving dynamic recrystallization of the base material. After traversing the path 130 at the joint, the friction stir welding tool 102 may be lifted from the material along a path 132. Accordingly, a weld may be created between the first part 122 and the second part 124.

Figure 4:
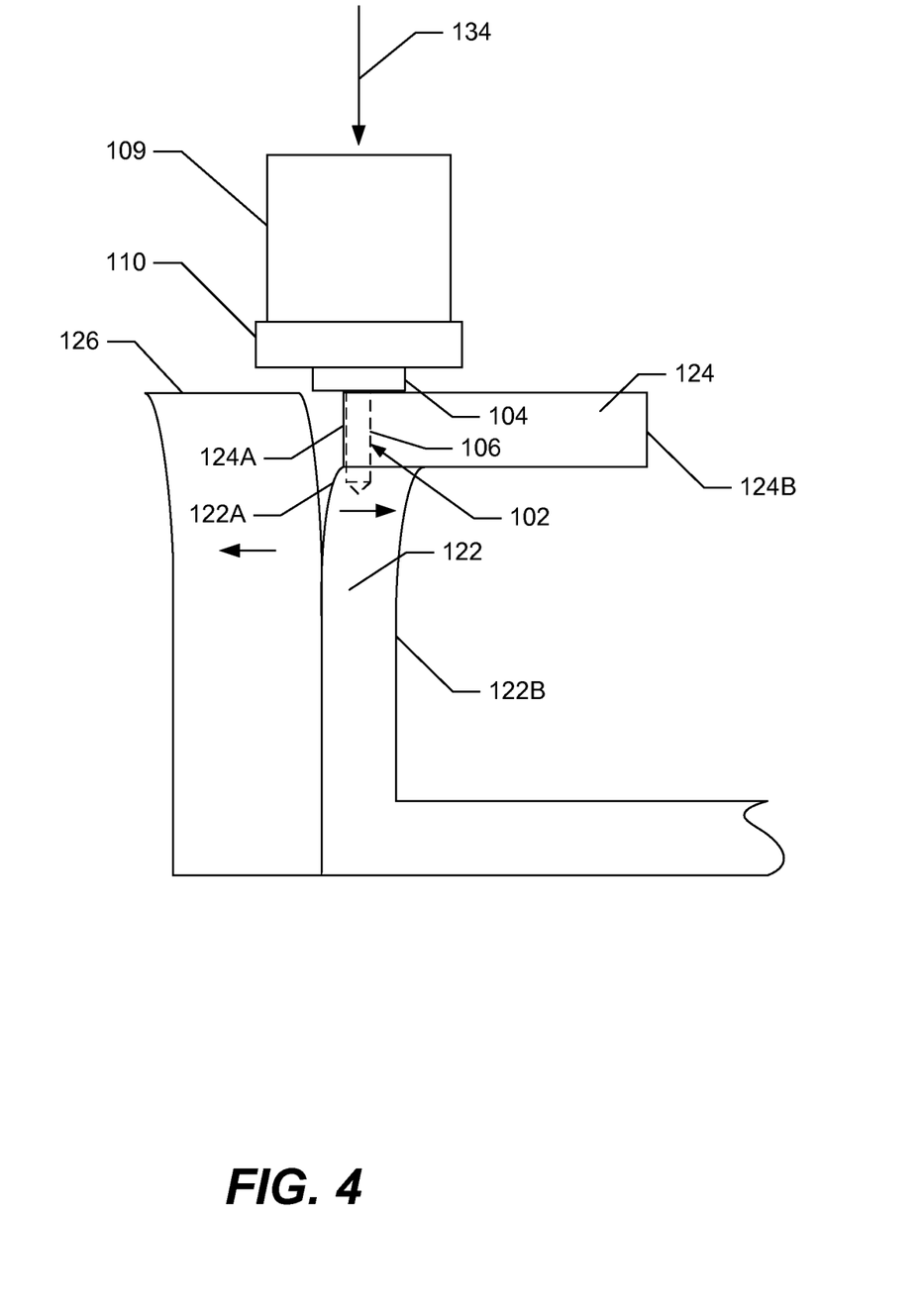
FIG. 4 illustrates the cross-sectional view through the fixture of FIG. 2 along line 3-3 during friction stir welding.

However, friction stir welding may present certain issues that may make forming a strong and aesthetically pleasing weld difficult. In this regard, friction stir welded parts and/or the fixture holding the parts may bend or otherwise move during the friction stir welding process. For example, as illustrated in FIG. 4, the actuator 112 may apply a force along a rotational axis 134 of the friction stir welding tool 104. The axial force 134, which may be on the order of 2-5 kN (kilonewtons) in some embodiments, may cause part and/or fixture geometry to change.

In this regard, as illustrated in FIG. 3, in some embodiments the fixture 126 may support outer edges 122A, 124A of the parts 122, 124, while leaving inner edges 122B, 124B thereof unsupported. Thus, as illustrated in FIG. 4, the inner edges 122B, 124B of the parts 122, 124 may bow inwardly away from the fixture 126 when subjected to the force along the axis 134 during friction stir welding. Alternatively or additionally, as illustrated, the fixture 126 may bend outwardly as a result of the force along the axis 132 transferring through one or both of the parts 122, 124 thereto. As may be understood the force along the axis 134 may cause the parts 122, 124 and/or the fixture 126 to bend in other manners.

As a result of movement of the first part 122, the second part 124, and/or the fixture 126, a weld created by the friction stir welding tool 102 may be detrimentally affected. For example, if one or both of the parts 122, 124 being welded is no longer in the same position as expected, defects can arise. By way of example, defects can include voids and cracks at the weld in addition to defects in the geometry of the resulting product. In this regard, the movement of the parts 122, 124 and the fixture 126 during friction stir welding may be difficult to predict, and accordingly use of a pre-set welding path may present issues even when the pre-set path attempts to predict movement of the parts.

Accordingly, embodiments of the present disclosure provided herein are directed to simulating friction stir welding. Thereby, one or more resultant parameters may be measured, as described in detail below. Accordingly, the conditions associated with friction stir welding may be measured without actually conducting a friction stir welding process.

Figure 5:
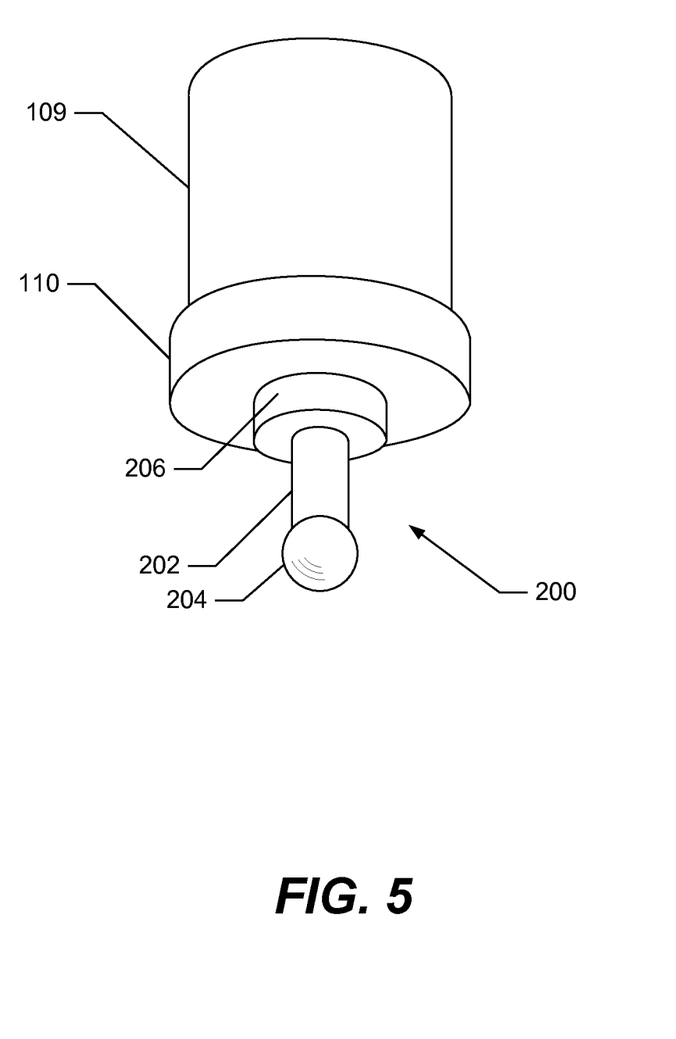
FIG. 5 illustrates a perspective view of a non-rotating friction stir welding test tool including a rounded head according to an example embodiment of the present disclosure.

In this regard, FIG. 5 illustrates a non-rotating friction stir test tool 200. As illustrated, the test tool 200 may be configured to couple to the tool holder 110. The tool holder 110 may be coupled to the spindle 109 of the friction stir welding system 100 described above or various other embodiments of friction stir welding systems.

In the embodiment of the non-rotating friction stir welding test tool 200 illustrated in FIG. 5, the test tool comprises a pin 202 defining a rounded head 204. The non-rotating friction stir welding test tool 200 may also include a sensor 206. The sensor 206 may be configured to measure one or more resultant parameters associated with axially forcing the non-rotating friction stir welding test tool 200 against a joint between two parts. In one embodiment the sensor 206 may comprise a force sensor (e.g., a strain sensor or load cell). The force sensor may be configured to determine a force axially applied through the non-rotating friction stir welding test tool 200. In another embodiment the sensor 206 may comprise an eddy-current sensor. In this regard, the eddy-current sensor may be configured to detect cracks or other defects caused by the application of force through the test tool 200 by placing the rounded head 204 of the pin 202 in contact with one or more of the parts being tested.

Figure 6:
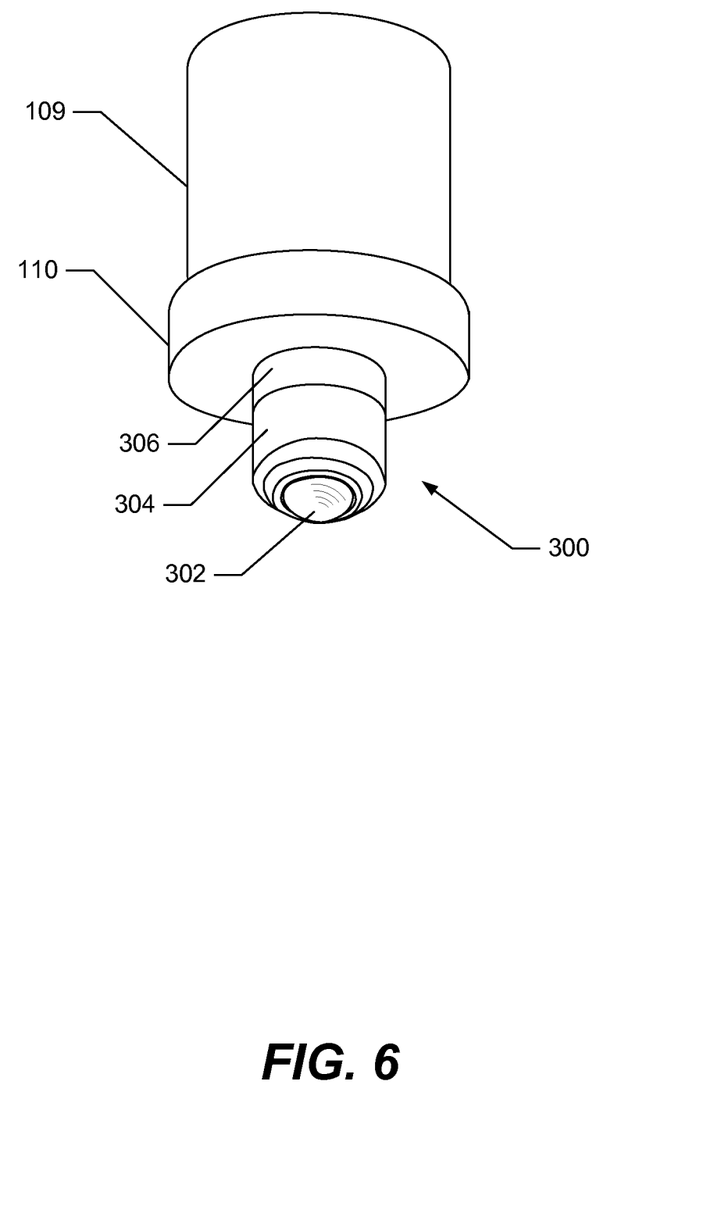
FIG. 6 illustrates a perspective view of a non-rotating friction stir welding test tool including a ball bearing roller according to an example embodiment of the present disclosure.

In an alternate embodiment, as illustrated in FIG. 6, a non-rotating friction stir test tool 300 may comprise a ball bearing roller 302. The ball bearing roller 302 may be retained in a housing 304 which allows the ball bearing roller to roll, even when force is applied to the ball bearing roller. In this regard, the ball bearing roller may comprise a ball bearing roller employed in conveyance systems. The non-rotating friction stir welding test tool 300 may additionally include a sensor 306. The sensor 306 may be configured to measure one or more resultant parameters associated with axially forcing the non-rotating friction stir welding test tool 300 against a joint between two parts. In one embodiment the sensor 306 may comprise a force sensor (e.g., a strain sensor or load cell). The force sensor may be configured to determine a force axially applied through the test tool 300.

Figure 7:
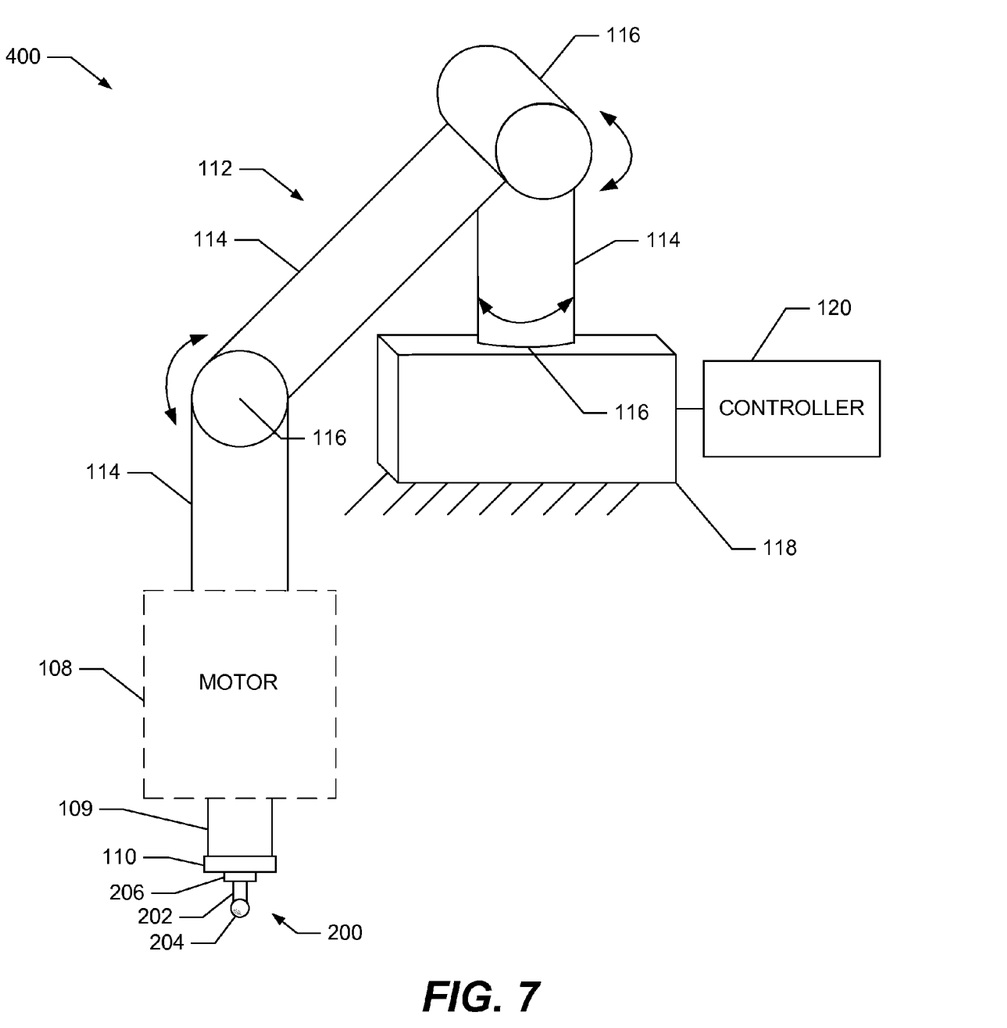
FIG. 7 schematically illustrates a portion of a system for simulating friction stir welding including a controller, an actuator, and a friction stir welding test tool according to an example embodiment of the present disclosure.

FIG. 7 illustrates a partial view of an example embodiment of a system for simulating friction stir welding 400. The system 400 may comprise many of the components of the above-described friction stir welding system 100 illustrated in FIG. 1. In this regard, the system of simulating friction stir welding 400 may comprise the actuator 112, the spindle 109, the tool holder 110, and the controller 120, as described above. However, various other embodiments of actuators (e.g., gantry systems) may be employed in other embodiments, and the robotic assembly illustrated in FIG. 7 is provided for example purposes only.

However, instead of including the friction stir welding tool 102, the system for simulating friction stir welding 400 comprises a non-rotating friction stir welding test tool. For example, the embodiment of the friction stir welding test tool 200 illustrated in FIG. 5 is included in the example embodiment of the system for simulating friction stir welding 400 illustrated in FIG. 7. However, various other embodiments of non-rotating friction stir welding test tools may be employed, such as the embodiment of the friction stir welding test tool 300 illustrated in FIG. 6. The non-rotating friction stir welding test tool 200, 300 may couple to the tool holder 110 in the same manner that the friction stir welding tool 102 couples thereto.

As further illustrated, the system for simulating friction stir welding 400 may optionally include the motor 108. However, as noted above, the friction stir welding test tools 200, 300 may be non-rotating. Non-rotating, as used herein refers to a lack of rotation about a longitudinal axis of the friction stir welding test tool 200, 300. In this regard, the motor 108 may be either excluded from the system for simulating friction stir welding 400, or the controller 120 may be configured to retain the motor 108 in an off configuration such that the friction stir welding test tool 200, 300 is not rotated.

Figure 8:
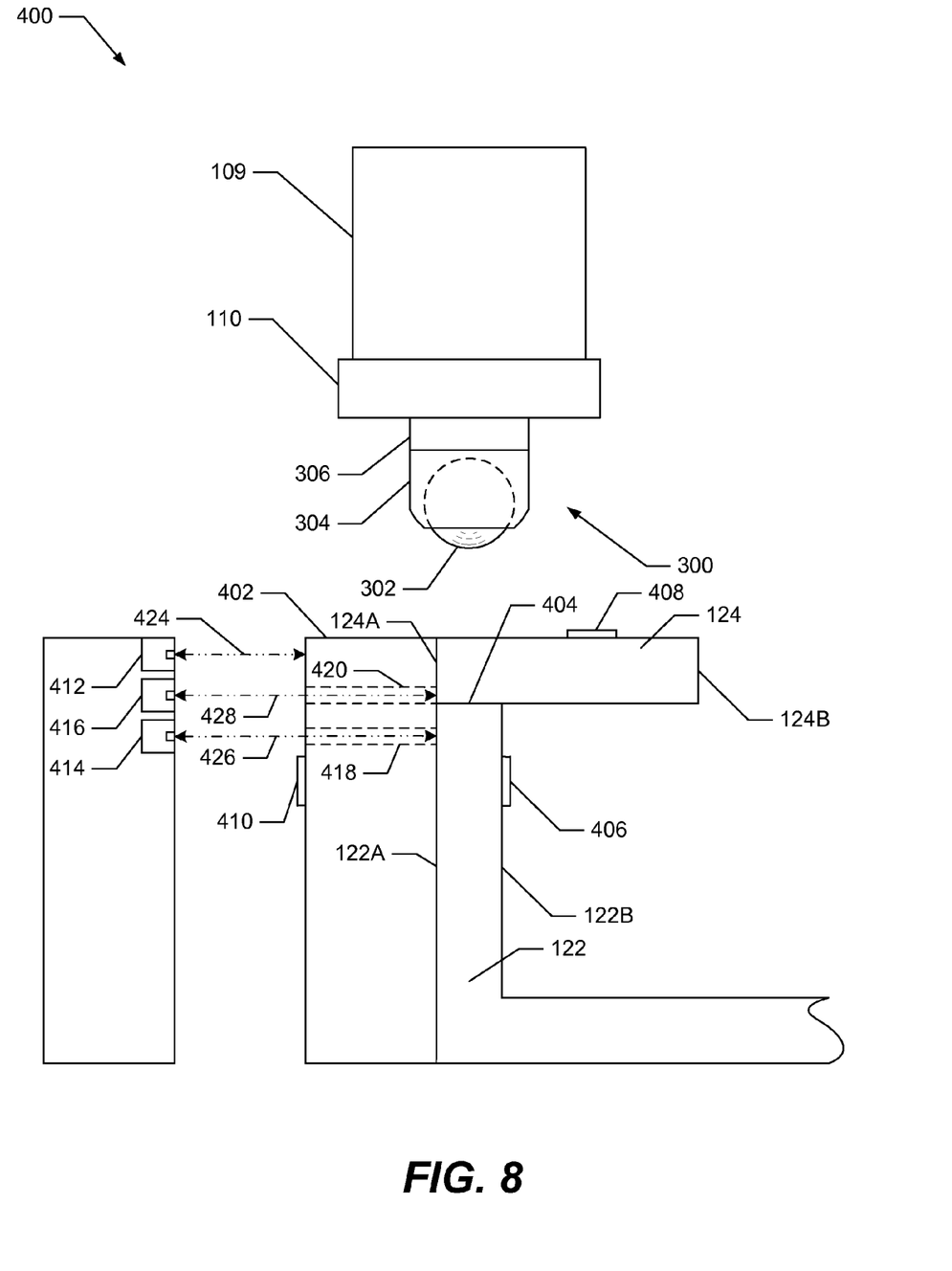
FIG. 8 illustrates a fixture of the system for simulating friction stir welding of FIG. 7 prior to simulating friction stir welding according to an example embodiment of the present disclosure.

FIG. 8 illustrates additional components of the system for simulating friction stir welding 400. Further, FIG. 8 illustrates inclusion of the embodiment of the non-rotating friction stir welding test tool 300 from FIG. 6, rather than the non-rotating friction stir welding test tool 300 from FIG. 5. In this regard, as noted above, various embodiments of non-rotating friction stir welding test tools may be employed in the system for simulating friction stir welding 400.

As illustrated in FIG. 8, the system for simulating friction stir welding 400 may additionally include a fixture 402 configured to hold a first part and a second part (e.g., the first part 122 and the second part 124 described above) with a joint 404 defined between the first part and the second part. The actuator 112 may be configured to apply an axial force along the longitudinal axis of the non-rotating friction stir welding test tool 300 against the first part 122 and the second part 124 at the joint 404 therebetween. In this regard, the system for simulating friction stir welding 400 may additionally include a sensor configured to measure one or more resultant parameters associated with axially forcing the non-rotating friction stir welding test tool 300 against the joint 404. The resultant factors may include a displacement of one or more of the first part 122, the second part 124, and the fixture 402. The result factors may additionally or alternatively include a force applied to one or more of the first part 122, the second part 124, and the fixture 402. Various other resultant parameters may also be measured.

As described above, in one embodiment the sensor may be mounted to the non-rotating friction stir welding test tool 300 (see, e.g., sensor 306). However, the sensor(s) may additionally or alternatively include a force sensor mounted to at least one of the first part 122, the second part 124, and the fixture 402. For example, in the illustrated embodiment a force sensor 406 is mounted to the first part 122, a force sensor 408 is mounted to the second part 124, and a force sensor 410 is mounted to the fixture 402. These sensors 406, 408, 410 may be mounted around the perimeter of the first part 122, the second part 124, and the fixture 402 in some embodiments. The force sensors 406, 408, 410 may thereby measure the force transferred to the components 122, 124, 402 to which they are attached. In some embodiments the force sensors 406, 408, 410 may comprise strain gauges. The location of the force sensors 406, 408, 410 may vary from the locations shown in the illustrated embodiment. In this regard, the illustrated embodiment is provided for example purposes only.

The sensor(s) may additionally or alternatively include a displacement sensor configured to measure a displacement of at least one of the first part 122, the second part 124, and the fixture 402. For example, in the illustrated embodiment first, second, and third displacement sensors 412, 414, 416 are mounted such that the displacement sensors can respectively determine a distance to the fixture 402, the first part 122, and the second part 124. These sensors 412, 414, 416 may be mounted around the perimeter of the first part 122, the second part 124, and the fixture 402 in some embodiments. In the illustrated embodiment the fixture 402 is provided with through holes 418, 420 that respectively allow the second and third displacement sensors 414, 416 to determine the distance to the first part 122 and the second part 124. The displacement sensors 412, 414, 416 may comprise optical or laser sensors in some embodiments, although various other embodiments of sensors configured to determine distance may be employed.

Figure 9:
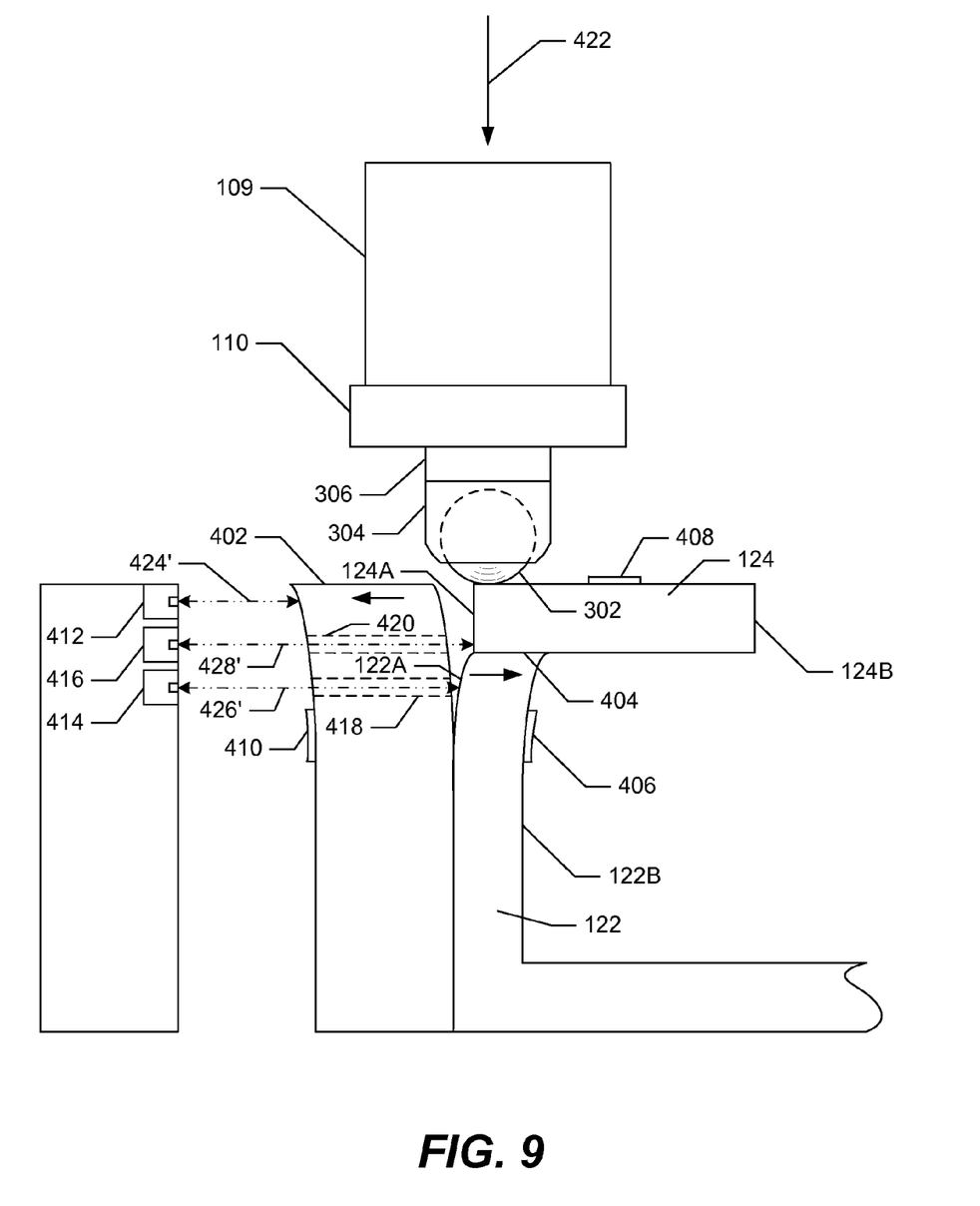
FIG. 9 illustrates the fixture of FIG. 8 during simulating friction stir welding according to an example embodiment of the present disclosure.

As illustrated in FIG. 9, the actuator 112 may apply an axial force along a longitudinal axis 422 defined by the non-rotating friction stir welding test tool 300 against the first part 122 and the second part 124 at the joint 404 therebetween. As described above, this may cause force to be transferred to the first part 122, the second part 124, and/or the fixture 402. These forces may be respectively measured by the force sensors 406, 408, 410. Further, the total force axially applied by the friction stir welding test tool 300 may be measured by the sensor 306 at the friction stir welding test tool.

Additionally, the displacement sensors 412, 414, 416 may respectively measure the displacement of the fixture 402, the first part 122, and the second part 124. In this regard, the axial force applied through the friction stir welding test tool 300 may simulate the force applied during friction stir welding, and hence the first part 122, the second part 124, and/or the fixture 402 may receive force and move in a manner similar to that which occurs during friction stir welding. Accordingly, the force received and movement of the first part 122, the second part 124, and/or the fixture 402 may be simulated without actually conducting a friction stir welding process, which involves use of rotary tools and heat, which may present danger when conducted without proper safety precautions. Further, friction stir welding may involve expenditure of materials.

A first (initial) position of the fixture 402, the first part 122, and the second part 124 may be determined by respectively measuring a first distance 424, 426, 428 from the displacement sensors 412, 414, 416 to the fixture, the first part, and the second part, as illustrated in FIG. 8. Thereafter, when the force is applied along the axis 422 of the friction stir welding test tool 300, the displacement sensors 412, 414, 416 may respectively measure a second (displaced) position of the fixture 402, the first part 122, and the second part 124 by respectively measuring a second distance 424', 426', 428' from the displacement sensors 412, 414, 416 to the fixture, the first part, and the second part, as illustrated in FIG. 9. Accordingly, the first 424, 426, 428 and second 424', 426', 428' distances may be compared to determine the displacement of the fixture 402, the first part 122, and/or the second part 124.

By axially applying force at a static location, resultant parameters such as the force applied to the first part 122, the second part 124, and/or the fixture 402 and/or the displacement of the first part, the second part, and/or the fixture may be measured. However, friction stir welding additionally typically involves transversely directing a friction stir welding tool along a joint between parts, as described above.

In this regard, the actuator 212 may be further configured to displace the non-rotating friction stir welding test tool 300 along the joint 404 between the first part 122 and the second part 124 in a manner mimicking the transverse movement that occurs during friction stir welding. Whereas the non-rotating friction stir welding test tool may comprise a flat head in embodiments in which the friction stir welding test tool is not displaced along the joint 404 between the first part 122 and the second part 124, it may be desirable to provide the non-rotating friction stir welding test tool with certain features configured to more accurately simulate friction stir welding when the non-rotating friction stir welding test tool is displaced along the joint.

In this regard, the non-rotating friction stir welding test tool 200 illustrated in FIG. 5 comprises a rounded head 204, which may allow the non-rotating friction stir welding test tool to more easily move traverse a path along the joint (e.g., along the path 130 illustrated in FIG. 2). However, some friction may occur between the rounded head 204 and the second part 124 during the transverse movement. In this regard, the ball bearing roller 302 of the embodiment of the non-rotating friction stir welding test tool 300 illustrated in FIG. 6 may be configured to reduce any frictional forces associated with transverse movement of the non-rotating friction stir welding test tool. Reduction or elimination of frictional forces associated with transverse movement may be desirable because axially applied forces may typically cause the undesirable deformation of the parts being welded and/or the fixture therefor, and hence simulating only axial forces may be desirable.

The various sensors described above (e.g., sensors 206, 306, and 406-416) may be in communication with the controller 120, or a separate controller. Thereby, the feedback from the sensors may be employed in a variety of manners. For example, the controller 120 may be configured to apply a predetermined desired axial force to the parts 122, 124. In this regard, the sensor 206, 306 mounted to the friction stir welding tool 200, 300 may indicate when the desired force is applied. As noted above, 5 kN axial forces are not uncommon in friction stir welding, and hence this force may be applied. Thereby, resultant parameters in terms of the force and/or displacement applied to the first part 122, the second part 124, and/or the fixture 402 may be determined.

During application of the force, the change in the force per a unit of time detected by the various force sensors 206, 206, and 406-410 may also be measured. Rapid changes in the force per unit of time may be indicative of a movement of the parts 122, 124 and/or the fixture 402. In an additional embodiment a predefined force may be applied and the displacement sensors 412-416 may be employed to determine the locations at which the parts 122, 124 and/or the fixture 402 moves the most. Thereby, the parts 122, 124 and/or the fixture 402 may be strengthened at these locations.

In another embodiment the controller 120 may be configured to apply an increasing force until the displacement sensors 412-416 detect a displacement above a predetermined limit. In this regard, by way of example, the maximum force that may be applied without moving the parts 122, 124 or the fixture beyond the predetermined limit may be determined. The predetermined limit of displacement may correspond to a maximum amount of displacement at which defects in the resulting weld are below an acceptable threshold. The maximum allowable force which may be applied which falls within the acceptable predetermined maximum amount of displacement may be determined for each point along the joint 404 between the parts 122, 124, or an overall maximum allowable force may be determined, which may correspond to the lowest of the acceptable forces along the joint. However, the controller 120 may employ the information measured by the sensors 206, 206, and 406-410 in other manners, as may be understood by one having skill in the art.

Figure 10:
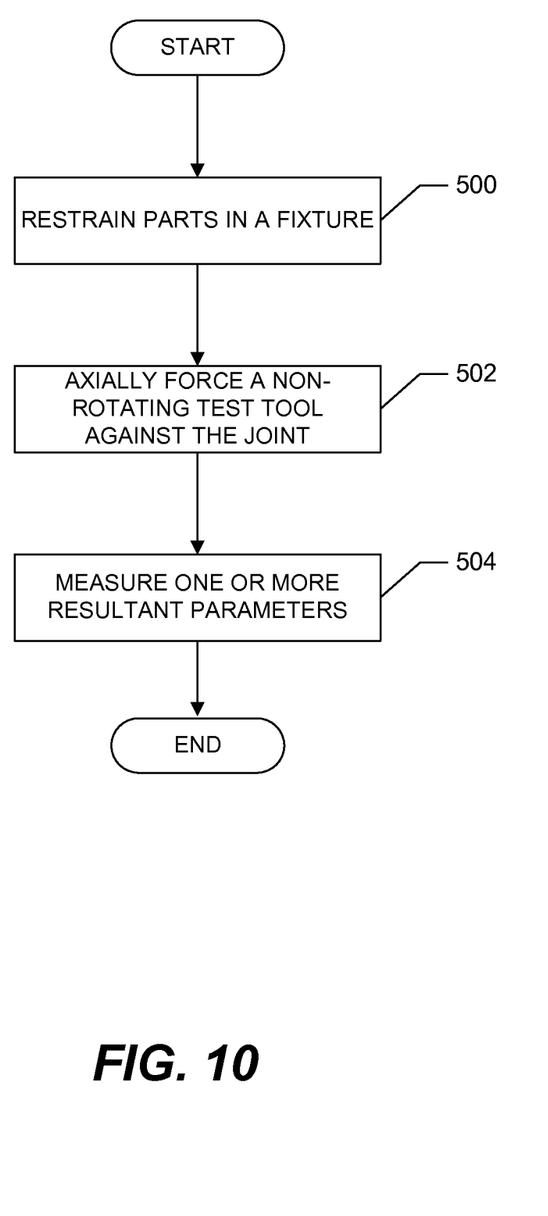
FIG. 10 illustrates a method for simulating friction stir welding according to an example embodiment of the present disclosure.

A related method for simulating friction stir welding is also provided. As illustrated in FIG. 10, the method may include restraining a first part and a second part in a fixture at operation 500. Further, the method may include axially forcing a non-rotating friction stir welding test tool against a joint between the first part and the second part at operation 502. The method may also include measuring one or more resultant parameters associated with axially forcing the non-rotating friction stir welding test tool against the joint at operation 504. The resultant parameters may comprise a displacement of one or more of the first part, the second part, and the fixture and a force applied to one or more of the first part, the second part, and the fixture.

The method may further comprise directing the friction stir welding test tool along the joint between the first part and the second part. Additionally, the method may include determining a maximum axial force that may be applied without exceeding a predetermined displacement limit. The method may also include employing the friction stir welding tool as an eddy-current sensor to detect a defect in the first part or the second part. In some embodiments axially forcing the non-rotating friction stir welding test tool against the joint at operation 502 may comprise axially forcing the friction stir welding test tool against the joint until the force reaches a desired force. Additionally, the resultant parameters may further comprise a change in the force per a unit of time.

Figure 11:
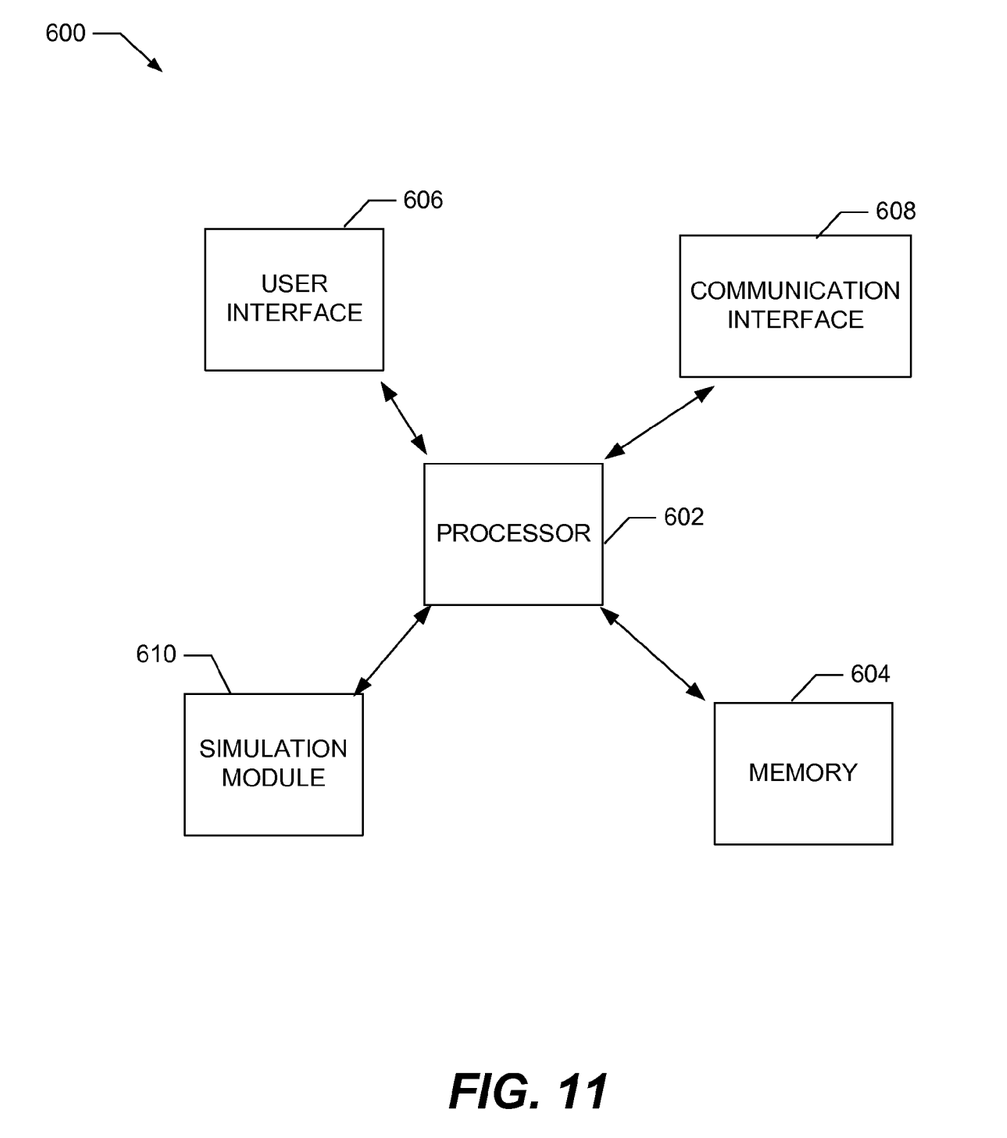
FIG. 11 illustrates a block diagram of an electronic device according to an example embodiment of the present disclosure.

FIG. 11 is a block diagram of an electronic device 600 suitable for use with the described embodiments. In one example embodiment the electronic device 600 may be embodied in or as the controller 120 for the system for simulating friction stir welding 400. In this regard, the electronic device 600 may be configured to control or execute the above-described friction stir welding simulation operations.

The electronic device 600 illustrates circuitry of a representative computing device. The electronic device 600 may include a processor 602 that may be microprocessor or controller for controlling the overall operation of the electronic device 600. In one embodiment the processor 602 may be particularly configured to perform the functions described herein. The electronic device 600 may also include a memory device 604. The memory device 604 may include non-transitory and tangible memory that may be, for example, volatile and/or non-volatile memory. The memory device 604 may be configured to store information, data, files, applications, instructions or the like. For example, the memory device 604 could be configured to buffer input data for processing by the processor 602. Additionally or alternatively, the memory device 604 may be configured to store instructions for execution by the processor 602.

The electronic device 600 may also include a user interface 606 that allows a user of the electronic device 600 to interact with the electronic device. For example, the user interface 606 can take a variety of forms, such as a button, keypad, dial, touch screen, audio input interface, visual/image capture input interface, input in the form of sensor data, etc. Still further, the user interface 606 may be configured to output information to the user through a display, speaker, or other output device. A communication interface 608 may provide for transmitting and receiving data through, for example, a wired or wireless network such as a local area network (LAN), a metropolitan area network (MAN), and/or a wide area network (WAN), for example, the Internet.

The electronic device 600 may also include a simulation module 610. The processor 602 may be embodied as, include or otherwise control the simulation module 610. The simulation module 610 may be configured for controlling or executing friction stir welding simulation operations, as described herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling simulation operations. In this regard, a computer readable storage medium, as used herein, refers to a non-transitory, physical storage medium (e.g., a volatile or non-volatile memory device, which can be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Thus, a non-transitory computer readable medium for storing computer instructions executed by a processor in a controller configured to control a system for simulating friction stir welding is provided. The non-transitory computer readable medium may comprise computer code for axially forcing a non-rotating friction stir welding test tool against a joint between a first part and a second part restrained in a fixture; and computer code for measuring one or more resultant parameters associated with axially forcing the non-rotating friction stir welding test tool against the joint. The resultant parameters may comprise a displacement of one or more of the first part, the second part, and the fixture and a force applied to one or more of the first part, the second part, and the fixture. The non-transitory computer readable medium also include computer code for directing the friction stir welding test tool along the joint between the first part and the second part. The non-transitory computer readable medium may further comprise computer code for determining a maximum axial force that may be applied without exceeding a predetermined displacement limit. Additionally, the non-transitory computer readable medium may include computer code for detecting a defect in the first part or the second part with an eddy-current sensor. The computer code for axially forcing the non-rotating friction stir welding test tool against the joint may comprise computer code for axially forcing the friction stir welding test tool against the joint until the force reaches a desired force. Also, the resultant parameters may further comprise a change in the force per a unit of time.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A method for physically simulating friction stir welding, comprising:
   physically restraining a first part and a second part in a fixture;
   axially forcing a non-rotating friction stir welding test tool against a joint between the first part and the second part; and
   measuring one or more resultant parameters associated with axially forcing the non-rotating friction stir welding test tool against the joint, wherein the resultant parameters comprise a displacement of one or more of the first part, the second part, and the fixture and a force applied to one or more of the first part, the second part, and the fixture.

2. The method of claim 1, further comprising directing the friction stir welding test tool along the joint between the first part and the second part.

3. The method of claim 1, further comprising determining a maximum axial force that may be applied without exceeding a predetermined displacement limit.

4. The method of claim 1, further comprising employing the friction stir welding test tool as an eddy-current sensor to detect a defect in the first part or the second part.

5. The method of claim 1, wherein axially forcing the non-rotating friction stir welding test tool against the joint comprises axially forcing the friction stir welding test tool against the joint until the force reaches a desired force.

6. The method of claim 1, wherein the resultant parameters further comprise a change in the force per a unit of time.

7. A system for simulating friction stir welding, comprising:
- a fixture configured to hold a first part and a second part in a welding configuration with a joint defined between the first part and the second part;
- a non-rotating friction stir welding test tool;
- an actuator configured to apply an axial force along the non-rotating friction stir welding test tool against the first part and the second part at the joint; and
- at least one sensor configured to measure one or more resultant parameters associated with axially forcing the non-rotating friction stir welding test tool against the joint, wherein the resultant parameters comprise a displacement of one or more of the first part, the second part, and the fixture and a force applied to one or more of the first part, the second part, and the fixture.

8. The system of claim 7, wherein the actuator is further configured to displace the non-rotating friction stir welding test tool along the joint.

9. The system of claim 7, wherein the non-rotating friction stir welding test tool comprises a pin defining a rounded head.

10. The system of claim 9, wherein the non-rotating friction stir welding test tool comprises an eddy-current sensor.

11. The system of claim 7, wherein the non-rotating friction stir welding test tool comprises a ball bearing roller.

12. The system of claim 7, wherein the sensor comprises a force sensor mounted to the non-rotating friction stir welding test tool.

13. The system of claim 7, wherein the sensor comprises a force sensor mounted to at least one of the first part, the second part, and the fixture.

14. The system of claim 7, wherein the sensor comprises a displacement sensor configured to measure the displacement of at least one of the first part, the second part, and the fixture.

15. A non-transitory computer readable medium for storing computer instructions executed by a processor in a controller configured to control a system for physically simulating friction stir welding, the non-transitory computer readable medium comprising:
- computer code for axially forcing a non-rotating friction stir welding test tool against a joint between a first part and a second part restrained in a fixture; and
- computer code for measuring one or more resultant parameters associated with axially forcing the non-rotating friction stir welding test tool against the joint, wherein the resultant parameters comprise a displacement of one or more of the first part, the second part, and the fixture and a force applied to one or more of the first part, the second part, and the fixture.

16. The non-transitory computer readable medium of claim 15, further comprising computer code for directing the friction stir welding test tool along the joint between the first part and the second part.

17. The non-transitory computer readable medium of claim 15, further comprising computer code for determining a maximum axial force that may be applied without exceeding a predetermined displacement limit.

18. The non-transitory computer readable medium of claim 15, further comprising computer code for detecting a defect in the first part or the second part with an eddy-current sensor.

19. The non-transitory computer readable medium of claim 15, wherein the computer code for axially forcing the non-rotating friction stir welding test tool against the joint comprises computer code for axially forcing the friction stir welding test tool against the joint until the force reaches a desired force.

20. The non-transitory computer readable medium of claim 15, wherein the resultant parameters further comprise a change in the force per a unit of time.

* * * * *